United States Patent
Yanosy, Jr.

(10) Patent No.: US 8,104,045 B1
(45) Date of Patent: Jan. 24, 2012

(54) UNIVERSAL DATA FORWARDING SYSTEM AND METHOD

(75) Inventor: John A. Yanosy, Jr., Grapevine, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1025 days.

(21) Appl. No.: 11/361,237

(22) Filed: Feb. 24, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/318; 709/202; 709/224

(58) Field of Classification Search .................. 719/318; 709/224, 202
See application file for complete search history.

(56) References Cited

U.S. PATENT DOCUMENTS

| | | | |
|---|---|---|---|
| 6,192,364 B1 * | 2/2001 | Baclawski | 707/10 |
| 6,446,136 B1 * | 9/2002 | Pohlmann et al. | 719/318 |
| 6,643,682 B1 * | 11/2003 | Todd et al. | 709/202 |
| 6,646,588 B2 * | 11/2003 | Tran | 342/29 |
| 6,751,657 B1 * | 6/2004 | Zothner | 709/220 |
| 6,820,121 B1 * | 11/2004 | Callis et al. | 709/225 |
| 7,010,586 B1 * | 3/2006 | Allavarpu et al. | 709/223 |
| 7,184,524 B2 * | 2/2007 | Digate et al. | 379/88.17 |
| 7,194,353 B1 * | 3/2007 | Baldwin et al. | 701/206 |
| 7,209,916 B1 * | 4/2007 | Seshadri et al. | 707/3 |
| 7,331,050 B2 * | 2/2008 | Vuppula | 719/318 |
| 7,487,512 B2 * | 2/2009 | Brunswig et al. | 719/318 |
| 2003/0050983 A1 * | 3/2003 | Johnson | 709/206 |
| 2004/0143659 A1 * | 7/2004 | Milliken et al. | 709/224 |
| 2005/0060414 A1 * | 3/2005 | Phillips et al. | 709/227 |

OTHER PUBLICATIONS

Pike, Tactical Digital Information Links (TADIL), FAS, Apr. 23, 2000, pp. 1-4.*

* cited by examiner

*Primary Examiner* — Diem Cao
(74) *Attorney, Agent, or Firm* — Donna P. Suehy; Daniel M. Barbieri

(57) ABSTRACT

The present invention is an adaptive system and method for forwarding data across a network. In an embodiment of the invention, the system and method of the present invention may subscribe to specific data-related events, determine if a stored ruleset applies to the data-related event, and execute the ruleset. Upon execution of the ruleset, a forwarding action may be required whereby particular recipients on a forwarding list associated with the ruleset may be notified of the data event.

21 Claims, 5 Drawing Sheets

UNIVERSAL DATA FORWARDING SYSTEM AND METHOD

FIELD OF THE INVENTION

The present invention relates generally to networking systems, and more particularly to an adaptive system and method for forwarding data across a network using rule based detected event definitions and flexible association events with unique forwarding definitions through employment of rulesets.

BACKGROUND OF THE INVENTION

In order to enhance military capability and defend threats, a network system including multiple nodes has been developed to allow quick and efficient data transfer among the nodes of the network. The network system may be known as a net centric system which refers to a service-based system of sensors, individuals, aircraft and the like which supports mutual awareness of situational events through data sharing. Critical information may be transferred to individuals and organizations that require situational relevant information in a quick and efficient manner. This may improve the efficiency and speed of combat operations and reduce military and terrorist threats.

Within a net centric system, it is vital that critical information is forwarded to any destination requiring the critical information. Conventional systems for forwarding data amongst nodes of a network are limited by a number of factors, for example, primarily lack of flexibility or inability to define different forwarding situations, inability to associate forwarding situations with system or network situational events, inability to change the data that should be forwarded for different forwarding situations, inability to change the destinations for receipt of forwarded data and the like. Conventional systems may be based upon a hard-coded software system with separate software components for each forwarding solution. This requires significant changes in software code or configurations of software components for any changes in forwarding procedures. Additionally, forwarding logic is typically embedded within the software code, and only software developers have access to the forwarding logic, severely constraining the ability to change forwarding capabilities for different situations or missions in the field. In addition, this software management problem prevents system integrators from changing or modifying forwarding situations without changing large configurations of software components that are not easily mapped to forwarding situations.

Conventional systems which forward critical information are also limited by their inability to efficiently forward messages between different tactical link pairs of different types, exemplified by one such pair defined as Link 16 and Link 11 according to a United States Department of Defense specification MIL-STD-6020. In a changing and evolving net centric environment, many different data forwarding situations and requirements will continually occur, and consequently, an adaptive system and method for dynamically creating new or modified forwarding data situations across a network is necessary.

SUMMARY OF THE INVENTION

Accordingly, the present invention is directed to an adaptive system and method for forwarding data across a network for different forwarding situations and triggering events, where a forwarding association is determined by a unique combination of a defined triggering event, forwarding ruleset, and possible actions referred to by each rule in the ruleset. In an embodiment of the invention, the system and method of the present invention may subscribe to specific data-related events, determine if a stored forwarding ruleset(s) applies to the data-related event, and execute the ruleset. Upon execution of the ruleset, a rule from the ruleset may be triggered resulting in the execution of a forwarding action whereby particular recipients and data elements on a forwarding list associated with the rules of the ruleset may subsequently receive the forwarded data elements.

It is contemplated that the system of the present invention may store and process a plurality of rulesets associated with different trigger event situations, and forwarding situations. Rulesets of the present invention may loosely couple conditional forwarding logic from definitions of forwarding actions in rule expressions, whereby each rule has an associated reference to a table or list of a set of actions and data that is associated with each forwarding action. Situational trigger events which require monitoring and associated forwarding situations may be easily altered through the management of the associations between the rulesets and the situational trigger events; additional forwarding situations may be defined by creation of additional rulesets and their associations with trigger events. This may provide an adaptive forwarding scheme which allows the integration and modification of situational events through rulesets whereby designated recipients may be notified of the situational event and receive the associated forwarded data as a result of the execution of the forwarding action.

In an additional aspect of the present invention, a method for forwarding data in accordance with an embodiment of the present invention is described. Method may begin upon storing rulesets applicable for different events and forwarding situations. Upon detecting a specific data event, a ruleset applicable to the data event may be selected. The selected ruleset may be executed wherein information associated with the specific data event may be forwarded appropriately to designated recipients.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Referring generally to FIGS. 1-5, a system and method for forwarding data in accordance with an embodiment of the present invention is shown. While conventional systems may provide forwarding of messages only, the system and method of the present invention may be utilized to forward messages and data amongst nodes of a network system. The forwarding system and method of the present invention may provide an adaptive and flexible architecture whereby forwarding situations may be defined without the requirement of creating new software code, components or services. A system control framework may be based on a common logic scheme which relies on individual logical constructions of system data events, and associations with system situations requiring action and action definitions. The forwarding system of the present invention may operate according to a method which coordinates the logical processing of data and system situational events, event associations with forwarding rulesets, and associations of system actions and destinations with each rule of the ruleset.

Advantageously, system behavior may be modifiable by adding additional rulesets or altering existing rulesets without the requirement of modifying the underlying architecture, modifying the association between events and rulesets, or modifying the action reference list and forward data list for each rule in a ruleset. This reduces the cost associated with system behavior programming, reconfiguration of system behavior and the like. The forwarding system of the present invention allows modification of rulesets and event/data associations in the field at run time which reduces down-time of the forwarding system. Extensible system behavior engineering is enabled through the rulesets which loosely couple conditional forwarding logic from references to forwarding actions lists in rule expressions. Customized system behavior for missions, platforms and other situations may be accommodated as well as integration with service oriented architecture, where service invocations may be controlled by rulesets. Additionally, the forwarding system of the present invention may coordinate interactions and data exchange with other subsystems and services to effect overall forwarding solutions through selection of forwarding actions as result of forwarding ruleset processing.

Figure 1:
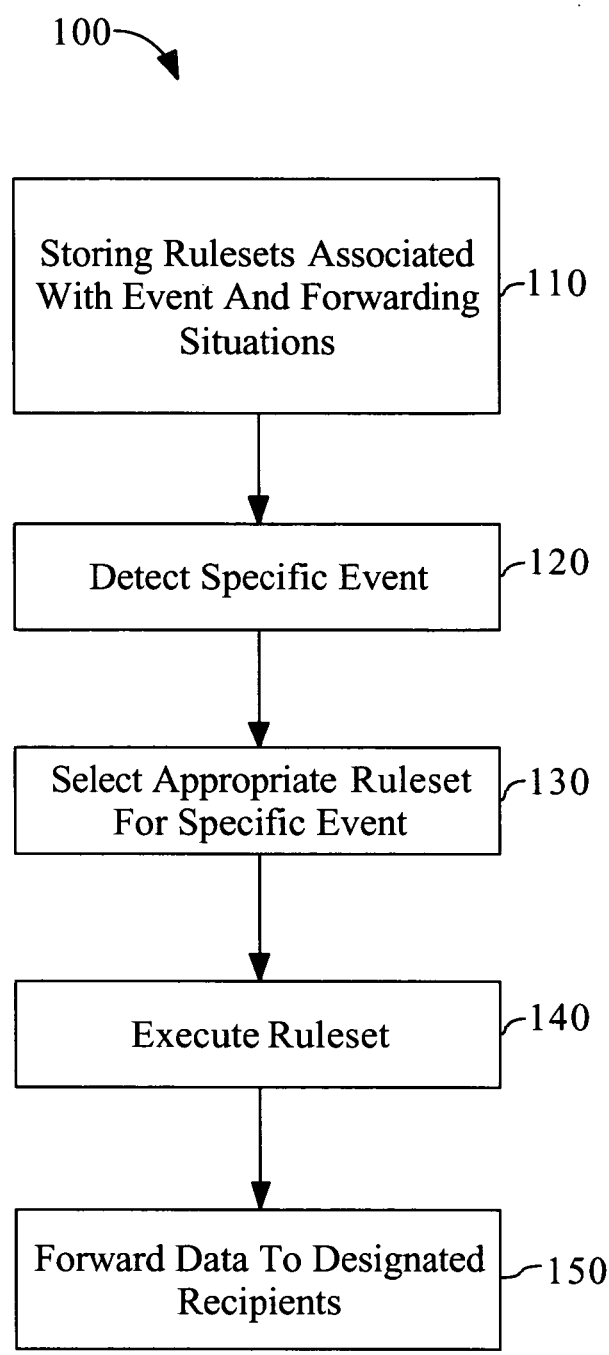
FIG. 1 depicts a method for forwarding data in accordance with an exemplary embodiment of the present invention.

Referring to FIG. 1, a method 100 for forwarding data in accordance with exemplary embodiment of the present invention is shown. Method 100 may begin upon storing rulesets applicable for different event and forwarding situations 110. A ruleset may include an event, a forwarding situation and a reference to a system action list. An event may be associated with a condition for forwarding. For example, if temperature is being monitored, and the temperature is above 25 degrees Celsius, this may be an event and a condition for forwarding. A forwarding situation may refer to data associated with the event that should be forwarded. This may include information for dealing with the high temperature. A system action may refer to the forwarding action and may include the destination list of recipients who may receive data and may also include the translation of the data whereby an external system may access the data for forwarding to the designated recipients. For example, data regarding the high temperature may be translated so that it may be placed within a message and sent to personnel by an external electronic mail system.

Upon detecting a specific data event 120, such as a high temperature reading as discussed, a ruleset applicable to the data event may be selected 130. It is contemplated that the forwarding system of the present invention may be network based, whereby a specific data event may refer to the receipt of data concerning an event, such as a high temperature, which may be processed according to one or more rulesets. The forwarding system may refer to an event-ruleset association table for selection of an appropriate ruleset to process the detected data event. The selected ruleset may be executed 140 wherein information associated with the specific data event may be forwarded appropriately to designated recipients 150. Execution of the ruleset may include the translation of the data into a format of each designated recipient, whereby an action rule associated with the ruleset may include a list of designated recipients associated with the event, such as a high temperature.

Figure 2:
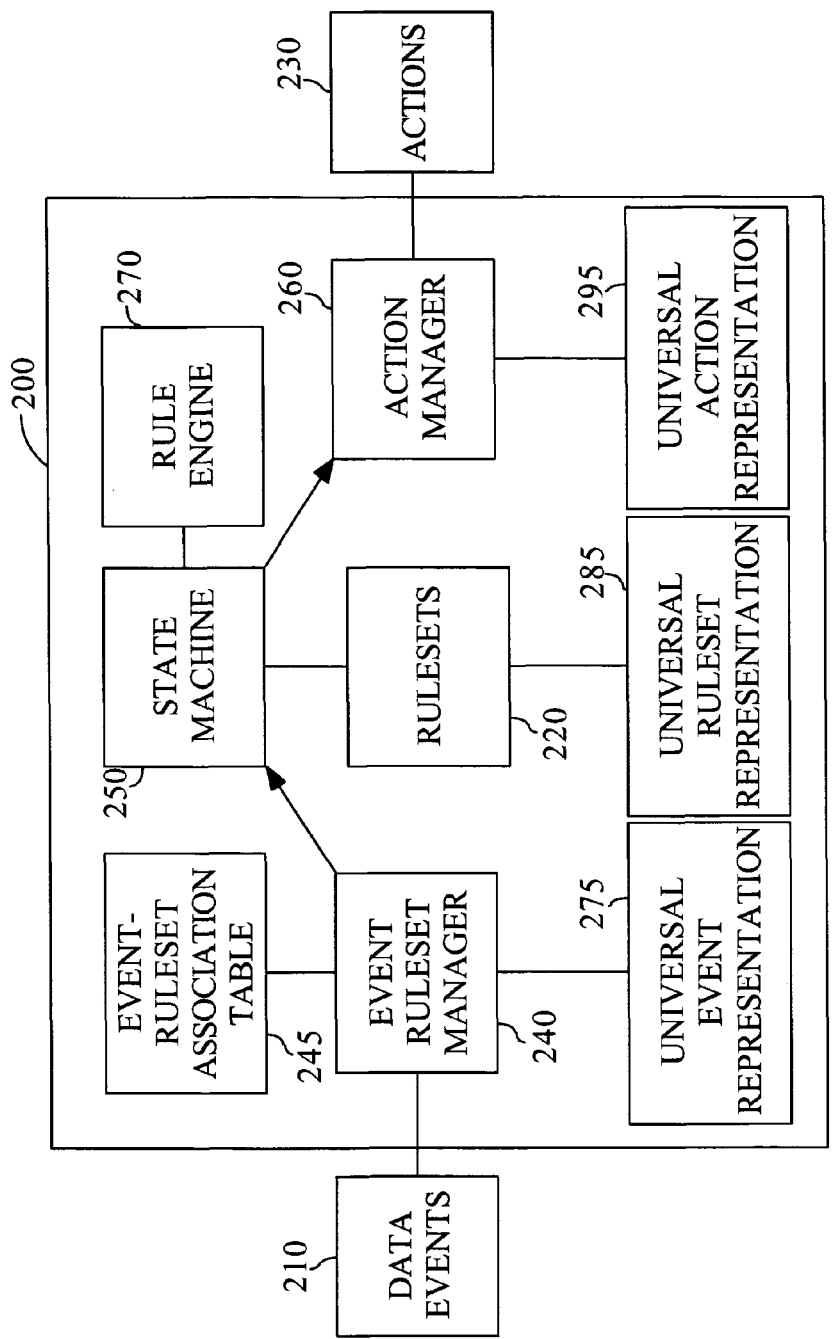
FIG. 2 depicts a system and its constituent elements for forwarding data in accordance with an embodiment of the present invention.

Referring to FIG. 2, a system 200 for forwarding data in accordance with an embodiment of the present invention is shown. System 200 may be capable of executing method 100 of FIG. 1 for forwarding data in accordance with an embodiment of the present invention. System 200 may receive data events 210 and may appropriately respond to data events 210 according to designated system behavior as directed in rulesets 220 whereby specific actions 230 may be performed by external components and systems. System 200 may include an event ruleset manager 240 that may receive data events and process associations between events and rulesets. Event ruleset manager 240 may operate with event-ruleset association table 245 which may define an association between subscribed data and message events with specific rulesets to guide ruleset selection by a state machine 250. State machine 250 may control the operation within system 200 according to the state diagram of FIG. 3, and action manager 260 may manage the association of an action list table of universal action representation 295, which associates desired actions with an action component of the ruleset, while actions 230 are performed by external components and systems. Rule engine 270 may execute rules under control of the state machine 250. Universal event representation 275, universal ruleset representation 285 and universal action representation 295 may refer to the language representing a rule, associations and metadata for events, rulesets, and actions respectively.

Figure 3:
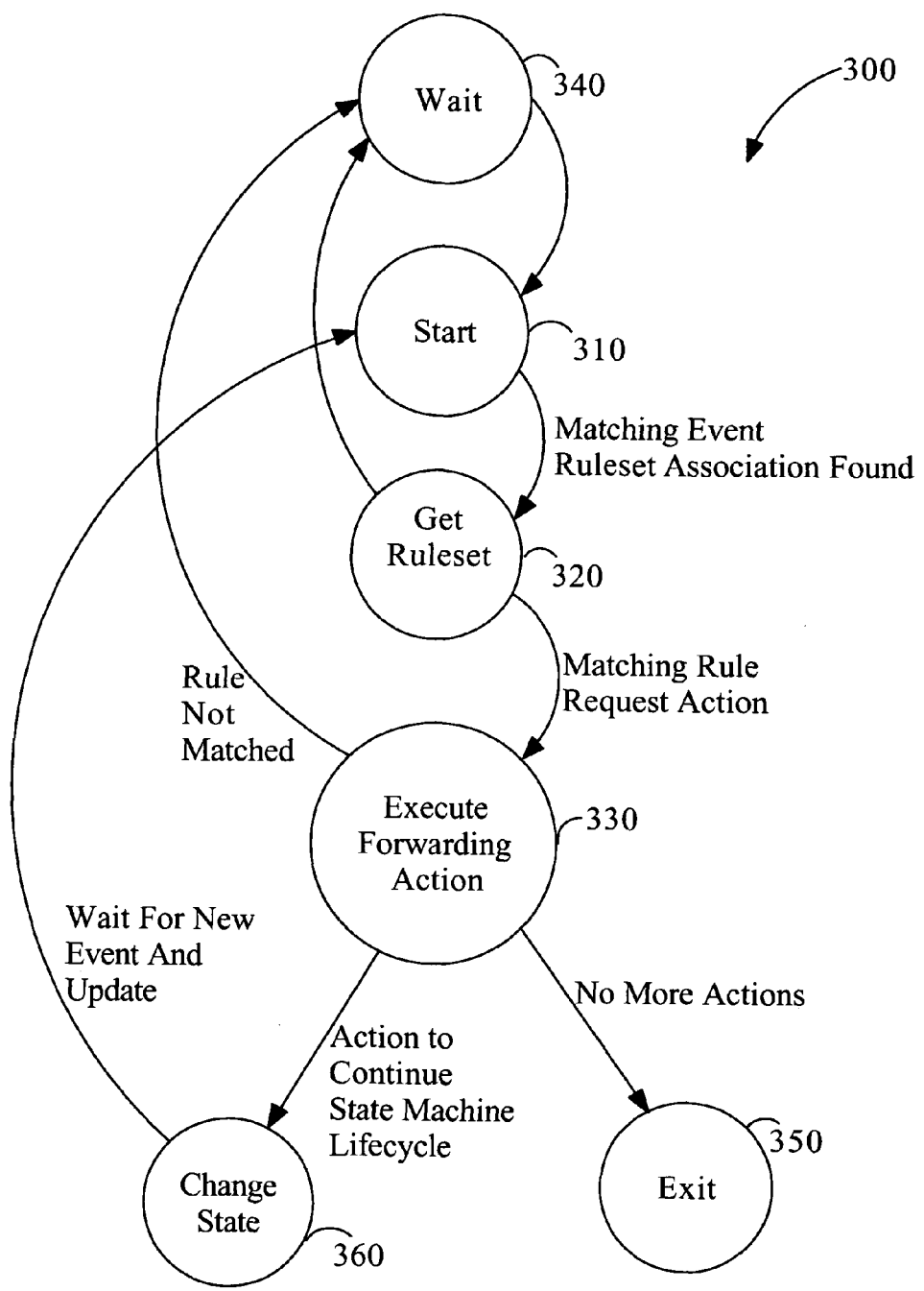
FIG. 3 depicts a state diagram of exemplary operation of the system for forwarding data forwarding data in accordance with an embodiment of the present invention.

Referring to FIG. 3, a state diagram 300 of exemplary operation of the system for forwarding data forwarding data in accordance with an embodiment of the present invention is shown. State machine 250 of FIG. 2 may operate according to the transitions and states displayed in the state diagram 300 of FIG. 3 to coordinate overall forwarding actions. The forwarding lifecycle may be determined by the ruleset and whether rules transition to the exit state or update the state variables and transition to the wait state for new event notifications. A start state 310 may be a first state and may transition to a get ruleset state 320 when a matching event ruleset association is found. An execute forwarding action state 330 may be a next state following a matched rule request action. From the execute forwarding action state, if a rule is not matched, the state machine may enter a wait state 340 for additional event notifications. If no more actions are requested, the state machine may enter an exit state 350. A change state 360 may be entered by an action to continue the state machine lifecycle.

Referring once again to FIG. 2, it is contemplated that state machine 250 may be implemented as a programmable logic array, software code, web-based service, or web-based server application system according to alternative embodiments of the present invention. Rule engine 270 may be a commercially available rule engine, such as an open API (JSR-000094

JAVA® Rule Engine API). It is contemplated that the rulesets of the present invention may comprise a plurality of rules whereby each rule in a ruleset may include logic to react to a trigger event. Universal event representation 275, universal ruleset representation 285 and universal action representation 295 may include published metadata definitions using industry standard information representation languages such as extensible markup language (XML/XMLS). Rule representation standards, such as XRML, RuleML and the like may be employed for development of the rulesets. Additional markup languages may be employed by those with ordinary skill in the art without departing from the scope and intent of the present invention.

Figure 4:
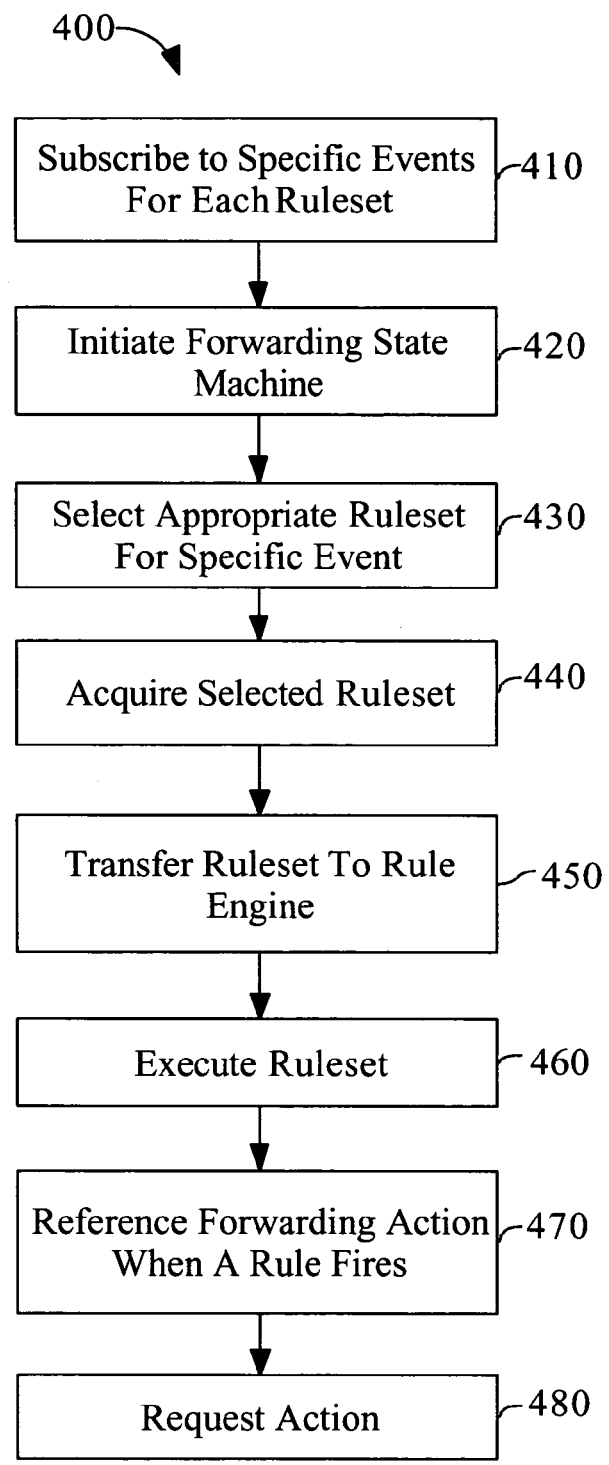
FIG. 4 depicts a detailed method for forwarding data in accordance with exemplary operation of a forwarding system of the present invention.

Referring to FIG. 4, a method 400 for forwarding data in accordance with an embodiment of the present invention is shown. It is contemplated that method 400 of FIG. 4 may be executed by system 200 of FIG. 2 for forwarding data in accordance with an embodiment of the present invention. Method 400 may begin upon subscribing to specific events for each ruleset 410. For example, a subscription may relate to a temperature reading whereby data associated with a high temperature may be a subscribed data event. The next step may include initiating a forwarding state machine 420 that may react to the specific event and data for each event. An appropriate ruleset may be selected for the specific subscribed event based on the event-ruleset association table 430. After acquiring the ruleset 440, the ruleset may be transferred to the rule engine 450. The rule engine may execute the selected ruleset 460. If a rule fires, specific forwarding actions may be referenced in the consequent part of the rule expression 470. Specific actions may be requested 480 for execution by external components and systems.

Figure 5:
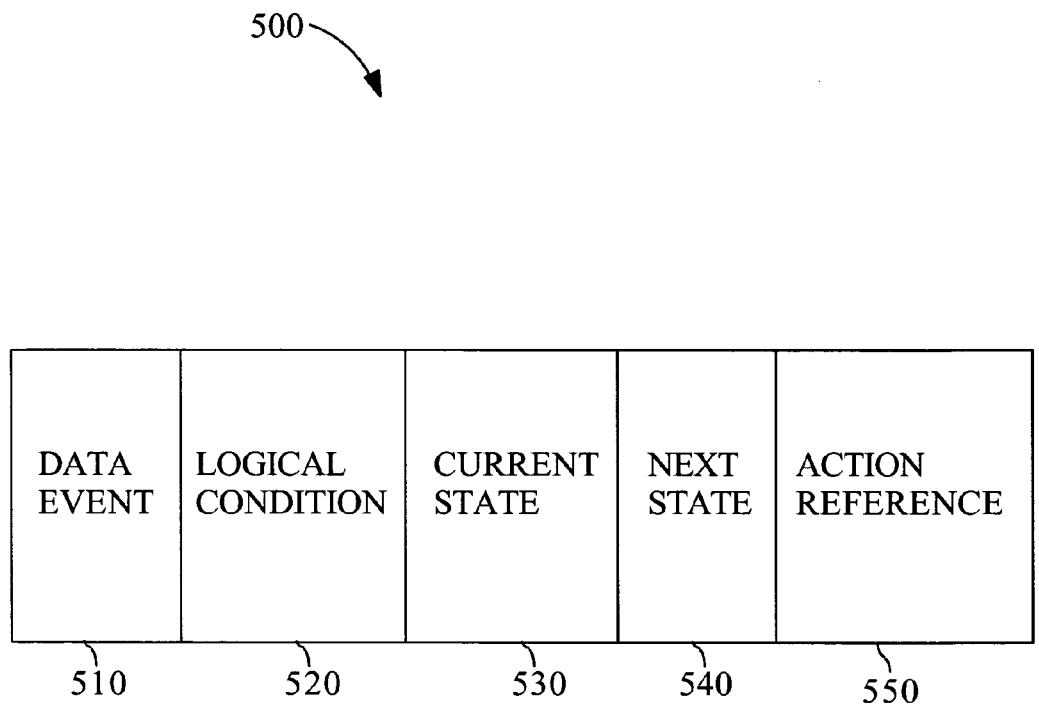
FIG. 5 depicts the components of a rule in accordance with an embodiment of the present invention.

Referring to FIG. 5, the components of a rule 500 in accordance with an embodiment of the present invention are shown. Rule 500 may include a data event 510, logical condition 520, current state 530, next state 540 and action reference 550. Each ruleset may include one or more rules where each rule may specify a logical combination of forwarding events, conditions and forwarding actions. Each rule may include a rule meta definition control document that may define its associated data event, forwarding destinations, and activation/deactivation state. This meta definition may be similar to a web service meta definitions in function, in that it uses a generic forwarding meta definition of universal event representation 275, universal ruleset representation 285 and universal action representation 295 of FIG. 2.

Data event 510 may refer to a specific event that may operate as a logical precursor to trigger rule processing by an event-driven rule engine. System 200 of FIG. 2 may coordinate with an events manager to subscribe to data events. Logical condition 520 may refer to the logical expression defining relations and dependencies on data element values, timing, link message responses, and state variable values that may be satisfied to enable triggering of action reference 550. Current state 530 may refer to the current state of progress in the data forwarding coordination sequence where next state 540 refers to the next sequential state in the data forwarding coordination sequence. Action reference 550 may include a reference to a service component operation that may cause a new data event, another rule to fire, a new forwarding message and the like.

It is contemplated that system 200 of FIG. 2 may be operable with other such systems whereby rulesets may be executed to operate cooperatively with other such systems. Additionally, multiple systems may be employed within a network whereby each system may operate to detect a certain type of event. This may reduce the number of rulesets stored at each system.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for forwarding data on a first system, the first system associated with at least a first type of event, wherein the first system cooperates with at least one other system, the at least one other system associated with at least one other type of event, comprising:
    storing rulesets associated with event and forwarding situations;
    detecting an event, wherein the event is of the at least first type of event;
    cooperating with the at least one other system to reduce storage of redundant rulesets on multiple systems, wherein the at least one other system detects at least one other type of event for other stored rule sets, the other stored rulesets stored on the at least one other system, the step of cooperating further including
        receiving forwarded messages from the at least one other system, the forwarded messages associated with the at least one other type of event detected by the at least one other system;
    selecting an appropriate ruleset associated with said event, the appropriate ruleset stored on the first system; and
    executing the appropriate ruleset, wherein said ruleset includes a condition for forwarding data and a rule included in said ruleset to forward data associated with said event to designated recipients, said designated recipients being listed within an association for the rule of said ruleset, said data forwarded to said designated recipients being translated into a format appropriate for each recipient of said designated recipients, said rule including a rule meta definition control document,
    wherein said rule meta definition control document is configured to define a data event associated with said rule, a forwarding destination associated with said rule, an activation state associated with said rule, and a deactivation state associated with said rule, said rulesets being configured to be modified while said appropriate ruleset is executed, wherein said data forwarded to said designated recipients being translated into a format appropriate for each recipient of said designated recipients include translating into a desired Tactical Digital Link format.

2. The method as claimed in claim 1, wherein said event is associated with a ruleset and where each rule of the ruleset has a defined situation where said condition has been met.

3. The method as claimed in claim 2 wherein said ruleset includes rules and ruleset associations for administering the event.

4. The method as claimed in claim 1, wherein said administering of the event is modifiable by modifying rules and associations between said event and said appropriate ruleset.

5. The method as claimed in claim 1, wherein said detecting of said event includes receipt of data associated with said event.

6. The method as claimed in claim 1, wherein said ruleset refers to a plurality of rules, each rule of said plurality of rules being formed according to a representation language.

7. The method as claimed in claim 1, wherein said rule includes a data event, a logical condition, a current state, a next state and an action reference.

8. The method as claimed in claim 7, wherein said action reference redirects to another rule.

9. The method as claimed in claim 1, wherein said executing the appropriate ruleset includes executing the appropriate ruleset via an open API rule engine.

10. The method as claimed in claim 1, wherein said event includes an environmental characteristic.

11. The method as claimed in claim 1, wherein said desired Tactical Digital Link format includes at least one of Link 11 or Link 16.

12. A method for forwarding data on a first system, the first system associated with at least a first type of event, wherein the first system cooperates with at least one other system, the at least one other system associated with at least one other type of event, comprising:
    subscribing to specific events for stored rulesets, wherein the specific events include the at least first type of event and are associated with the stored rulesets, said rulesets stored on the first system;
    cooperating with the at least one other system to reduce storage of redundant rulesets on multiple systems, wherein the at least one other system detects at least one other type of event for other stored rule sets, the other stored rulesets stored on the at least one other system, the step of cooperating further including
    receiving forwarded messages from the at least one other system, the forwarded messages associated with the at least one other type of event detected by the at least one other system;
    initiating a state machine upon a detection of an event;
    selecting an appropriate ruleset for said event; and
    executing the appropriate ruleset, wherein data associated with said event is forwarded to designated recipients, said designated recipients being listed within a rule of said ruleset, said data forwarded to said designated recipients being translated into a format appropriate for each recipient of said designated recipients, said rule including a rule meta definition control document,
    wherein said rule meta definition control document is configured to define a data event associated with said rule, a forwarding destination associated with said rule, an activation state associated with said rule, and a deactivation state associated with said rule, said rulesets being configured to be modified while said appropriate ruleset is executed, wherein said data forwarded to said designated recipients being translated into a format appropriate for each recipient of said designated recipients include translating into a desired Tactical Digital Link format.

13. The method as claimed in claim 12, wherein said rulesets include a condition for forwarding data.

14. The method as claimed in claim 12, wherein said event is associated with a ruleset and where each rule of the ruleset has a defined situation where said condition has been met.

15. The method as claimed in claim 14, wherein said rulesets includes ruleset associations for administering the event.

16. The method as claimed in claim 15, wherein said administering of the event is modifiable by modifying rules and associations between events and rulesets of said appropriate ruleset.

17. The method as claimed in claim 14, wherein detection of said event, includes receipt of data associated with said event, selection of rule, and analysis of whether said condition has been met.

18. The method as claimed in claim 12, further comprising:
    acquiring said appropriate ruleset by said state machine; and
    transferring said appropriate ruleset to a rule engine for execution of said ruleset.

19. The method as claimed in claim 12, wherein said rule includes a data event, a logical condition, a current state, a next state and an action reference.

20. The method as claimed in claim 19, wherein said action reference redirects to another rule.

21. The method as claimed in claim 12, wherein said desired Tactical Digital Link format includes at least one of Link 11 or Link 16.

* * * * *